United States Patent [19]

Ljungberg

[11] Patent Number: 4,709,799
[45] Date of Patent: Dec. 1, 1987

[54] ARRANGEMENT FOR ORIENTING ARTICLES ON A CONVEYOR

[75] Inventor: Per-Allan Ljungberg, Lund, Sweden

[73] Assignee: Tetra Pak International AB, Lund, Sweden

[21] Appl. No.: 729,204

[22] Filed: May 1, 1985

[30] Foreign Application Priority Data

May 8, 1984 [SE] Sweden ............................. 8402464

[51] Int. Cl.⁴ .......................................... B65G 47/24
[52] U.S. Cl. .................................. 198/412; 198/407; 198/817
[58] Field of Search ............... 198/412, 415, 411, 817, 198/402, 403, 406, 407

[56] References Cited

U.S. PATENT DOCUMENTS

| | | | |
|---|---|---|---|
| 2,491,255 | 12/1949 | Edwards | 198/817 X |
| 3,767,028 | 10/1973 | Rosso . | |
| 3,770,581 | 11/1973 | Orbison et al. | 198/817 X |
| 4,078,652 | 3/1978 | MacFarland et al. | 198/817 X |
| 4,085,839 | 4/1978 | Crawford . | |

FOREIGN PATENT DOCUMENTS

| | | |
|---|---|---|
| 2059815 | 6/1972 | Fed. Rep. of Germany . |
| 2405615 | 8/1974 | Fed. Rep. of Germany . |
| 1397921 | 6/1975 | United Kingdom . |
| 341732 | 7/1972 | U.S.S.R. . |

Primary Examiner—Robert J. Spar
Assistant Examiner—Lyle Kimms
Attorney, Agent, or Firm—Burns, Doane, Swecker & Mathis

[57] ABSTRACT

In the packaging industry finished packing containers are frequently transported by means of chain conveyors between different machines or handling points. A reorientation of the packing containers, e.g. from a horizontal to a vertical position, may then be required. To achieve this, an arrangement may be included as an integrated part on a conveyor, making use of the chain and drive elements of the conveyor. The chain is then led with the help of pulleys on a path which is such that several parts of the chain, while successively changing position, travel close to the packing container conveyed so that the latter during its advance through the arrangement is reorientated from a horizontal to vertical position.

8 Claims, 5 Drawing Figures

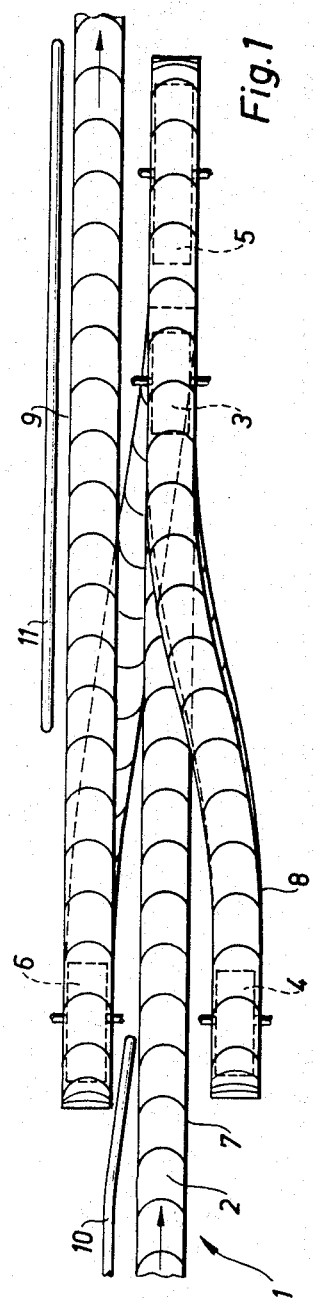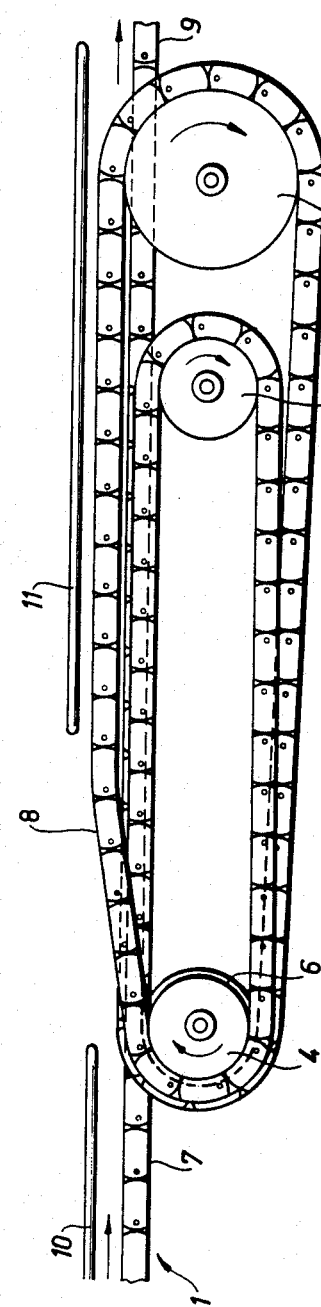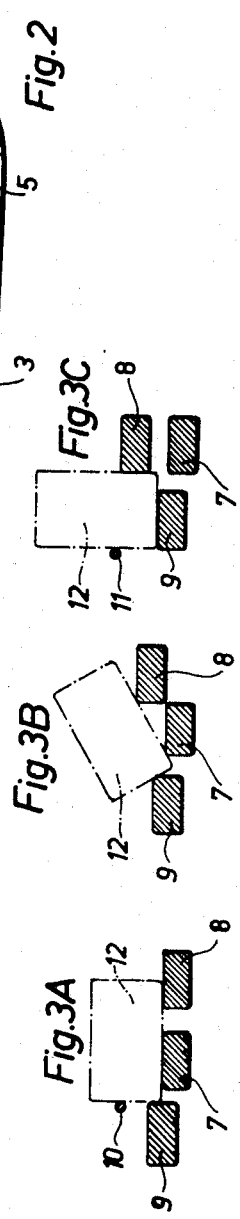

ARRANGEMENT FOR ORIENTING ARTICLES ON A CONVEYOR

The present invention relates to conveyors, and more particularly to arrangements for altering the positional orientation of an object on a conveyor.

BACKGROUND OF THE INVENTION

In the mass production of geometrically regularly formed objects, e.g. packages of different types, chain or belt conveyors are frequently used for the transport of objects from the manufacturing machines to other machines in which a further processing or handling is to take place. In the manufacture of consumption packages for e.g. milk or juice, the individual packing containers are usually conveyed to a machine where the packing containers are brought together and packed into collective packages of the tray type. In this connection there is frequently a need for the packing containers to be turned during transport if they are delivered from the manufacturing machines with a positional orientation which does not correspond to the desired positional orientation the packing containers should have when they are placed into the collective packages. The said consumption packages are delivered e.g. from the packing machine in horizontal position, whilst it is desirable to place the packing containers into the collective package in vertical position. The necessary raising of the individual packing containers is usually carried out with the help of separate package handling devices which by means of movable elements take charge of, and turn, the packing containers transported on the conveyor. The packing containers are then transferred to a subsequent conveyor for the further transport to a machine which groups the packing containers together and places them into collective packages.

This known type of package-raising device thus forms a separate unit which is driven by means of a separate drive unit and the control elements associated therewith. The package-raising devices have to be placed in a break between two conveyors and special stands have to be provided for the supporting of the package-raising devices in the desired position in relation to the conveyors. This design is relatively expensive and the transfer between the different units constitutes a potential source of error which may affect safety.

SUMMARY OF THE INVENTION

It is an object of the present invention to provide an arrangement of the aforementioned type which is not subject to the said disadvantages but is of a simple and inexpensive design which safeguards good operational safety.

It is a further object of the present invention to provide an arrangement on a conveyor which is integrated with the conveyor and is designed so as to alter in the simplest manner the positional orientation of the objects transported.

These and other objects have been achieved in accordance with the invention in that an arrangement of the type described in the introduction has been given the characteristic that the conveying element is led between the inlet and outlet end of the arrangement along a path which is such that on the active part of the arrangement several parts of the conveying element travel in substantially the same direction but with a successively altered mutual positional relationship as viewed in the direction of movement of the conveyor.

Preferred embodiments of the arrangement in accordance with the invention have been given, moreover, the characteristics which are evident from the subsidiary claims.

By designing the arrangement in accordance with the invention as a part completey integrated into the existing conveyor, one eliminates not only the need for a separate drive unit but also all the remaining connecting elements, manoeuvring elements etc., so that the total cost of the arrangement becomes very low at the same time as operational safety is sustantially increased.

DESCRIPTION OF THE DRAWINGS

A preferred embodiment of the invention is shown in the accompanying drawings, in which:

FIG. 1 is a top plan view of the apparatus in accordance with this invention;

FIG. 2 is a side elevational view of the apparatus of FIG. 1; and

FIGS. 3A, 3B and 3C are cross-sectional views through the active parts of the conveying element of the conveyor along the lines A—A, B—B and C—C, respectively, in FIG. 1.

DETAILED DESCRIPTION

Referring to FIGS. 1 and 2, the arrangement can be designed on a conventional conveyor which comprises a conveying element in the form of a chain 1 which is composed of individual links 2 in articulated connection, and which is therefore articulated and flexible in vertical as well as in lateral direction. The conveyor moreover comprises a great number of pulleys and rollers which support the conveying element as well as suitable steering rails, guides or other elements for steering and supporting the conveying element and leading it onto the desired path. The conveying element or chain 1 is driven by an electric motor, not shown, which acts upon the chain via a pulley. In the upper part of the conveying element guides or steering plates are arranged on either side which prevent the conveyed objects present on the top surface of the chain 1 from sliding off the conveying element. In addition to the components mentioned the conveyor also comprises other mechanical elements, e.g. stands, supporting and fixing members which simliar to the majority of the components included in the conveyor and which have been mentioned earlier are of a conventional type well known to those versed in the art, and need not be described here in any detail. The majority of the conventional parts are not shown in the drawings either since they would only impair the clarity of the figures. They are also unnecessary for an understanding of the basic construction of the arrangement.

The arrangement in accordance with the invention constitutes an integrated part of an existing conveyor and, as mentioned earlier, comprises the conveying element or chain 1 of the conveyor. The conveying element or chain 1 is led in the arrangement in accordance with the invention on a path which is such that a majority of parts of the conveying element travelling side by side and in the same main direction co-operate so as to alter the positional orientation of an object, e.g. a packing container, conveyed by the conveyor. In addition to the conveying element 1 the arrangement in accordance with the invention comprises a number of pulleys 3 to 6 inclusive, with the help of which the conveying element 1 is led between the inlet and outlet end of the arrangement (to the left and right respectively in FIGS. 1 and 2) on a path which is such that a number of active parts of the conveying element travel in substantially the same direction through the arrangement in accordance with the invention. The said parts which are located in the upper, active part of the arrangement comprise on the one hand a first part 7 which constitutes a linear continuation of the conventional conveyor, as well as a second part 8 and a third part 9 which are situated on either side of the said first part 7. The mutual positional relationship between at least two of the parts is altered successively as viewed in the direction of movement of the conveyor, that is to say from left to right in the FIGS. 1 and 2.

The different active parts of the conveyor are led along the desired paths with the help of the pulleys 3 to 6 inclusive mentioned earlier. The incoming first part 7 of the conveying element 1 first passes between the pulleys 4 and 6 located at the inlet end of the arrangement so as to extend substantially in a straight path up to the pulley 3 which is located at the opposite end of the arrangement in accordance with the invention. The conveying element 1 travels around the pulley and back towards the inlet end of the arrangement in a lower plane below the pulleys, to be led upwards again at the inlet end with the help of the pulley 4 to substantially the same level as the incoming first part 7. After passing the pulley 4, the conveying element 1 forms the second active part 8 which, as mentioned previously, travels at the inlet end of the arrangement side by side with, and at the same level as, the first part 7 so as to travel at the outlet end of the arrangement substantially above the said first part 7. The part 8 thus rises successively with the help of underlying steering rails (not shown in the drawing) on its path from the pulley 4 at the same time as it swings in sideways over the first part 7 which is clearly evident in particular from FIG. 1. After the second part has reached in the vicinity of the outlet end of the arrangement a position substantially straight above the first part 7, the second part 8 reaches the pulley 5 and is then led down again to the lower plane of the arrangement to be led back as a passive part against the direction of transport to the inlet end of the arrangement. At the inlet end the conveying element 1 passes the pulley 6 which preferably has the same centre axle as the pulley 4 but is of a larger diameter and is placed at the opposite side of the incoming part 7. The conveying element 1 is led upwards again over pulley 6 to the upper active part of the arrangement where it forms the third active part 9 of the arrangement. At the inlet end of the arrangement the second part 8 and third part 9 of the conveying element 1 will then be situated on either side of the first part 7, but the third part 9 is located a little higher than the first and second parts. At this somewhat higher level the third part travels parallel with the first part 7 along the whole length of this and proceeds, after having passed the outlet end of the arrangement, once more in a preferably straight continuation of the conventional conveyor.

As can be seen from the above, the three active parts of the conveying element thus extend substantially in the same direction. Two of the parts, namely the first part 7 and the third part 9 are parallel whereas the second part successively approaches the first part as viewed in the direction of movement of the conveyor. At the same time the second part 8 is led obliquely upwards so that from its initial position at the same level as the first part it reaches a final position straight above the first part. The difference in height between the second and the third part at the outlet end of the arrangement amounts to substantially one half the height of the object whose positional orientation is to be altered with the help of the arrangement in accordance with the invention. A certain adaptation of the mutual positional relationship of the different active parts is generally required as a function of the type of object which is to be handled. Beside the width of the conveying element which, of course, already on the conveyor has to be adapted to the object which is to be conveyed, a certain adjustment of the mutual height relationship between the incoming first part 7 and the outgoing third part 9 may be necessary. Along parts of the conveying element further steering rails or guides 10 and 11 are present which are shown in the drawings and which are situated at the inlet end and at the outlet end respectively of the arrangement. The guide 10 is spaced above the incoming part 7 and approaches the part 7 successively as seen in the direction of movement of the part (FIG. 1). The second guide 11 runs along one side of the third part 9 and is substantially parallel with the third part 9. Further guides may also be appropriate, but this will depend upon the shape of the object which has to be handled by the arrangement, and the guides 10 and 11, like the different pulleys 3 to 6 inclusive, therefore are preferably adjustable laterally as well as vertically.

During operation of the arrangement in accordance with the invention the conveying element 1 or the chain is driven in conventional manner with the help of the drive element of the conveyor, e.g. an electric motor connected via a pulley not shown in the drawing. The conveying element 1 travels at the desired speed through the arrangement in accordance with the invention, steered by the pulleys 3 to 6 inclusive as described earlier. The objects delivered on the conveyor are fed to the arrangement in accordance with the invention at its inlet end where they arrive at uniform intervals, resting on the upper plane surface of the conveying element. The objects delivered are placed substantially symmetrically in relation to the conveying element 1 and are led in the direction of the arrangement in accordance with the invention by means of guides or steering surfaces arranged along both sides of the conveying element (not shown in the drawing). When an object approaches the arrangement in accordance with the invention it makes contact with the guide 10 provided on the one side of the conveying element which, viewed in the direction of movement of the conveying element, is located at the left side of the incoming or first part 7 (FIG. 3A) and is placed slightly obliquely so that it successively approaches the conveying element. As a result the guide 10 will steer the object conveyed so that it is displaced from its earlier symmetrical position in relation to the conveying element sideways in the direction towards the second part 8. The distance between the second part 8 and the first part 7 at the inlet end of the arrangement is chosen so that the object conveyed 12, as is evident from FIG. 3A, partically projects over, and rests against, the second part 8 of the conveyor. All the parts of the conveyor move at the same speed and in substantially the same direction, and the object conveyed will be displaced therefore successively from left to right in FIGS. 1 and 2. Since the second part 8 successively alters position in vertical as well as lateral direction, the part of the object 12 which rests against the second part 8 will be successively raised, as is evident for FIG. 3B. In this position the object, e.g. a packing container, has passed the rear end of the guide 10 and the object is now prevented from sliding to the left in FIG. 3B by means of the third part 9 which is located at a slightly higher plane than the first part 7. The base surface of the object 12 or packing container will rest against the third part 9 at the same time as the edge adjoining the base surface extends slightly downwards between the first part 7 and the third part 9 which effectively counteracts any sliding of the object sideways off the second part 8.

During the continued movement of the object 12 (to the right in FIGS. 1 and 2) the object is raised further through the action of the second part 8 which successively approaches the third part 9 and ultimately is situated straight above the first part 7, as illustrated in FIG. 3C. In this position the object conveyed has been fully raised to a vertical position and now rests upon the third part 9 of the conveying element. The guide 11 now contributes to directing the object in a correct manner so that it does not slide off the conveying element during the continued movement, and the objects can now be transported further in raised position with the help of the conveying element 1 along the continuing extension of the conveyor. Any correction of the position of the object in lateral direction can be carried out with the help of further guides or steering rails and such devices are also provided in a conventional manner on the continuing part of the conveyor, not shown.

As evident from the above description an alteration in the positional orientation of the object is achieved exclusively through the co-operation between different parts of the conveying element, and any further movable elements acting upon the object thus are not required. This means that the arrangement in accordance with the invention is given a very simple design, and since the arrangement, moreover, consists exclusively of conventional elements, its manufacturing and operating costs will be low. The simplicity and robustness of the arrangement moreover considerably facilitate the cleaning and upkeep of the arrangement which is particularly important in the handling of e.g. packing containers in the food industry.

While this invention has been described and illustrated in accordance with a preferred embodiment, it should be recognized that variations and changes can be made without departing from the invention, as set forth in the claims.

I claim:

1. Conveyor apparatus capable of altering the positional orientation of an object while continuously moving the object in a direction, comprising: an endless flexible conveying belt adapted to carry objects as the belt moves along a path in a first direction and means for guiding said belt about a location along said path so that said belt while moving in said first direction at said location forms a first path part, a second path part and a third path part, said first and third path parts being mutually parallel, said third path part being situated along one side of said first path part, said second path part being in side-by-side relation with, and on the same level as, the first path part at an upstream portion of said second path part, said second path part being located on a side of the first path part which is opposite said third path part at the upstream portion of the second path part, said second path part overlapping the first path part at a downstream portion of said second path part, said first and second path parts cooperating so that an incoming object on the first path part projects over onto the second path part, said first path part being adapted to carry objects into said location, said third path part being adapted to carry objects beyond said location and said second path part because of its changing position relative to said first path part along said path engages the object to alter its positional orientation and urges the object onto said third path part.

2. Conveyor apparatus in accordance with claim 1, wherein downstream portions of said second and third path parts are at different heights, the height of the downstream portion of the second path part being greater than the height of the downstream portion of the third path part by an amount substantially equal to one half of the height of the object.

3. Conveyor apparatus in accordance with claim 1, wherein said guiding means includes pulleys.

4. Conveyor apparatus in accordance with claim 1, further comprising rail means along an upstream portion of said first path part for urging an object at least partially onto the upstream portion of the second path part.

5. Conveyor apparatus in accordance with claim 4, further comprising second rail means along a downstream portion of said third path part for orienting an object on said third path part.

6. Conveyor apparatus in accordance with claim 1, wherein said third path part is raised relative to said first path part.

7. Conveyor apparatus for orienting objects on the conveyor while the conveyor is moving, comprising an endless conveyor element bendable laterally and vertically; guide means for guiding said element along a first path part, a second path part and a third path part with said first, second and third path parts being arranged to move at the same speed and substantially in the same direction; said first path part being substantially straight, said second path part having an upwardly inclined section and a raised section and a laterally progressive section and a straight section in sequence, and said third path part being parallel with said first path part and situated along one side thereof, said first path part being side by side with said second path part along said inclined section and vertically below said second path part along said straight section, said first and second path parts cooperating so that an incoming object on the first path part projects over onto the second path part, said second path part, because of its changing position relative to the first path part along said path, progressively orienting an object on the conveyor element and urging the object onto said third path part as said object moves along the conveyor.

8. The conveyor apparatus according to claim 7, including rail means along a downstream portion of said third path part for orienting an object on said third path part.

* * * * *